US007639619B2

United States Patent
Xu

(10) Patent No.: US 7,639,619 B2
(45) Date of Patent: Dec. 29, 2009

(54) SYSTEM AND METHOD FOR QUALITY OF SERVICE (QOS) SETUP OF A NETWORK SEGMENT HAVING AN INTERMEDIATE DEVICE

(75) Inventor: Shugong Xu, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 448 days.

(21) Appl. No.: 11/422,877

(22) Filed: Jun. 7, 2006

(65) Prior Publication Data

US 2007/0286074 A1    Dec. 13, 2007

(51) Int. Cl.
 *H04L 12/26* (2006.01)
 *H04L 12/56* (2006.01)
 *H04L 12/66* (2006.01)
(52) U.S. Cl. .............. 370/235; 370/230; 370/230.1; 370/236; 370/401; 370/395.21
(58) Field of Classification Search .................. None
See application file for complete search history.

(56) References Cited

U.S. PATENT DOCUMENTS

| | | | |
|---|---|---|---|
| 6,154,776 A | 11/2000 | Martin | |
| 6,446,126 B1 | 9/2002 | Huang et al. | |
| 6,690,649 B1 | 2/2004 | Shimada | |
| 7,551,606 B2 | 6/2009 | Iwamura | |
| 2002/0181395 A1 | 12/2002 | Foster et al. | |
| 2003/0005130 A1 | 1/2003 | Cheng | |
| 2003/0106067 A1* | 6/2003 | Hoskins et al. | 725/119 |
| 2003/0202468 A1 | 10/2003 | Cain et al. | |
| 2003/0202476 A1 | 10/2003 | Billhartz et al. | |
| 2004/0008689 A1 | 1/2004 | Westphal et al. | |
| 2004/0105415 A1 | 6/2004 | Fujiwara et al. | |

(Continued)

OTHER PUBLICATIONS

Giovanelli, Flavio; Bigini, Glauco; Solighetto, Marco. "A UPnP-based bandwidth reservation scheme for In-Home Digital Networks". Feb. 23-Mar. 1, 2003. IEEE, 10th International Conference on Telecommunications, 2003. vol. 2. pp. 1059-1064.*

(Continued)

*Primary Examiner*—Daniel J Ryman
*Assistant Examiner*—Michael Fialkowski
(74) *Attorney, Agent, or Firm*—Thomas R. Berthold

(57) ABSTRACT

A system and method configures quality-of-service (QoS) in a segment of a network that has multiple segments with an intermediate device between the segments. The network may be a home network for the transmission of audio-video traffic streams between a media server or source, like a personal computer (PC), and a media renderer or sink, like a digital TV, with the intermediate device being a router, bridge or hub connected to its own network segment and located between the source and sink. One of the network devices contains a QoS parameter holder (QPH). After QoS has been configured in the source and sink and the traffic stream established, the intermediate device detects the traffic stream and determines that it needs to set up QoS. The intermediate device queries the QPH with a traffic stream identifier. The QPH finds the traffic descriptor that matches the traffic stream identifier and returns to the intermediate device the traffic descriptor that includes the QoS parameters. The intermediate device then uses the QoS parameters to configure QoS in its network segment.

23 Claims, 4 Drawing Sheets

U.S. PATENT DOCUMENTS

| | | | |
|---|---|---|---|
| 2005/0165899 A1* | 7/2005 | Mazzola | 709/217 |
| 2006/0133391 A1* | 6/2006 | Kang et al. | 370/401 |
| 2006/0218302 A1 | 9/2006 | Chia et al. | |
| 2007/0162981 A1 | 7/2007 | Morioka | |
| 2007/0211632 A1* | 9/2007 | Song et al. | 370/230 |
| 2008/0291930 A1* | 11/2008 | Damola et al. | 370/401 |

OTHER PUBLICATIONS

Hlasny, Daryl; et al. "UPnP QoS Architecture:1.0". Mar. 10, 2005. UPnP Forum. pp. 1,8,20,27. <http://www.upnp.org/standardized-dcps/documents/UPnP_QoS_Architecture1.pdf>.*

Choi, Sung-Gi; Kang, Dong-Oh; Lee, Jeun-Woo. "A Media Distribution System supporting Priority-based QoS in a Home Network". Feb. 20-Feb. 22, 2006. IEEE, The 8th International Conference on Advanced Communication Technology, 2006. vol. 3. pp. 1532-1536.*

Hlasny, Daryl; et al. "UPnP QoS Architecture:1.0". Mar. 10, 2005. UPnP Forum. pp. 5,17. <http://www.upnp.org/standardizeddcps/documents/UPnP_QoS_Architecture1.pdf>.*

Dutt, "Bringing quality of service to IP", Byte, Jun. 1998 v23 n6 p49(2).

Mao et al., "Video Transport Over Ad Hoc Networks: Multistream Coding With Multipath Transport", IEEE Journal on Selected Areas in Communication, vol. 21, No. 10, December 2003, pp. 1721-1737.

Choi et al; "An UPnP based media distribution system supporting QoS in a converged home network"; 2006 IEEE/IFIP Network Operations and Management Symposium (IEEE Cat. No. 06CH37765C), Apr. 3, 2006, Apr. 7, 2006 XP002442251; Piscataway, NJ, USA.

Ditze e tal; "Towards end-to-end QoS in service oriented architectures", Industrial Informatics, 2005. INDIN '05. 2005 3RD IEEE International Conference on Perth, Australia, Aug. 10-12, 2005, Piscataway, NJ, USA, IEEE, Aug. 10, 2005, pp. 92-97, XP010865378.

EPO Search Report (Jul. 24, 2007).

* cited by examiner

SYSTEM AND METHOD FOR QUALITY OF SERVICE (QOS) SETUP OF A NETWORK SEGMENT HAVING AN INTERMEDIATE DEVICE

BACKGROUND OF THE INVENTION

1. Field of the Invention

This invention relates generally to networks that require Quality-of-Service (QoS) parameters for data traffic streams, such as streaming audio and/or video (audio-video or "AV"), and more particularly to a system and method for configuring QoS in a network segment that has an intermediate device located between the source device and sink device.

2. Description of the Related Art

Quality-of-Service (QoS) in the field of packet-switched networks refers to a broad collection of networking capabilities and techniques to assure that a packet succeeds in passing between two points in the network. QoS elements of network performance typically include bandwidth (throughput), latency (delay), and error rate. The goal of QoS is to improve the user experience of a network's ability to deliver predictable results for sensitive applications. Certain types of network traffic, such as streaming AV, may require QoS to guarantee throughput. These types of traffic require a certain level of bandwidth to function—any more than required is unused, and any less will render the service non-functioning.

QoS is becoming increasingly important in local area networks (LANs) used in the home. These LANs may use a wide variety of existing cabling or non-engineered placement of wireless access points with technologies that have varying underlying bandwidth. Home networking equipment is typically installed by users with no knowledge of networking management and no desire to actively manage their networks. Furthermore, applications in the home tend to be AV-intensive with different bandwidth characteristics. Home LANs typically include wired LANs, like 10/100baseT Ethernet, and wireless local area networks (WLANs), such as those based on the well-known IEEE 802.11 or Wi-Fi standards. Other types of WLANs include ultrawideband (UWB) networks that have a fairly short range but very high throughput. Another type of LAN, one that does not use wireless transmission, is a powerline communications (PLC) network that uses the existing electrical wiring in a home or single building, such as a PLC network based on the HomePlug™ standard.

The setup or configuration of QoS in home network devices, such as consumer electronic (CE) devices like stereo receivers, digital video recorders (DVRs), digital TVs and AV servers, is important for AV applications. In a home network AV application the source device for the AV traffic stream is the media server, such as a personal computer (PC) or DVR, and the sink device is the media renderer, such as a digital TV. To set up QoS for a given AV application requires cooperation between QoS signaling and underlying L2 (Layer 2 in the Internet protocol (IP) stack) network QoS setup. The signaling informs the underlying L2 of the QoS parameters for the AV application. A difficulty arises in QoS setup if the home network has multiple network segments with the media server on one segment and the media renderer on another segment. A segment refers to a section of a network that shares a common physical medium. The boundaries of a network segment are established by devices or nodes, such as routers, bridges and hubs, that are capable of regulating the flow of traffic into and out of the segment. QoS setup in a network with multiple segments requires that the intermediate device or node between the segments know the QoS parameters for the AV application so that it can configure QoS in its network segment.

Currently there are no simple methods for QoS setup of a network segment in a network having multiple segments connected by an intermediate device. In an approach proposed by the Universal-Plug-and-Play (UPnP™) forum, a QoS manager (QM) needs to signal each network device along the path of the AV traffic stream. This requires the QM to discover the path of the AV traffic stream and then send QoS parameters to each of the devices along the path. However, this method is considered relatively complex. In another proposed approach, QoS signaling occurs only to the two end devices, i.e., the source and sink, and the intermediate device is required to measure the AV data to determine the QoS parameters. However, in this method, the accuracy and speed of the measurement may make the QoS setup in the segment unreliable.

What is needed is a system and method for simple and reliable QoS configuration of a network segment in a network having multiple segments connected by an intermediate device where there is only QoS signaling to the two end devices.

SUMMARY OF THE INVENTION

The invention relates to a system and method for QoS setup of a network segment in a network having multiple segments connected by an intermediate device. The intermediate device or node, which is typically a router, bridge or hub connected to its own network segment, is located between the source device and the sink device. One of the network devices contains a QoS parameter holder (QPH), which is a software module or component located within the memory of the device. First, QoS signaling configures QoS in just the two end devices, i.e., the source and the sink, and the traffic stream, typically an AV traffic stream, is established. The intermediate device then detects the traffic stream, for example by detecting the packet pattern or the IP/port/protocol information, and determines that it needs to set up QoS for the traffic stream. The intermediate device then queries the QPH with a traffic stream identifier, i.e., the detected traffic stream information (IP addresses, port numbers, protocol, etc). The QPH then finds the traffic descriptor that matches the traffic stream identifier and returns to the intermediate device the traffic descriptor that includes the QoS parameters. The QoS parameters include traffic characteristics like peak rate, mean rate, delay requirement and loss requirement, which the intermediate device uses to configure QoS in its network segment, i.e., to allocate bandwidth for the traffic stream. This assures that other devices on the same network segment as the intermediate device do not adversely affect the QoS of the traffic stream from the source device to the sink device. After QoS has been configured on the intermediate device and its network segment, the intermediate device may optionally signal the QPH with the status of the QoS configuration for the network segment, e.g., that QoS setup has been successful or has failed.

In one aspect of the invention it is possible that the input to the QPH includes only part of the traffic stream identifier, in which case the QPH may return more than one traffic descriptor, each with its own set of QoS parameters. The intermediate device then finds the correct traffic descriptor by matching it with the information it has about the traffic stream, i.e., the traffic stream identifier. This matched traffic descriptor contains the appropriate QoS parameters which the intermediate device uses to configure its network segment.

DETAILED DESCRIPTION OF THE INVENTION

The invention will be described for a home LAN based on the UPnP architecture, and in particular to a home LAN that distributes an AV traffic stream between a serving device and a rendering device, but the invention is fully applicable to other types of network architectures distributing other types of traffic streams. UPnP AV technology is defined in "UPnP Device Architecture, Version 1.0," and is built upon Internet Protocol (IP), Transmission Control Protocol (TCP), User Datagram Protocol (UDP), Hypertext Transfer Protocol HTTP, and Extensible Markup Language (XML). UPnP AV technology defines two AV devices, a media server and a media renderer. The user must be able to browse the AV media items stored on the media server or available for transmission from the media server, select a specific item, and cause it to be played on the media renderer. To provide a uniform mechanism for media rendering devices to browse the AV media items available from the media server and to obtain detailed information about individual items, UPnP AV technology defines a Content Directory Service (CDS) in the media server. The CDS provides a method for the media server to publish a listing of the media items that it can serve, along with related metadata, such as a UPnP Traffic Descriptor, for each media item. For ease of explanation the invention will be described using QoS concepts and syntax as described in "UPnP QoS Architecture, Version 1.0."

Figure 1:
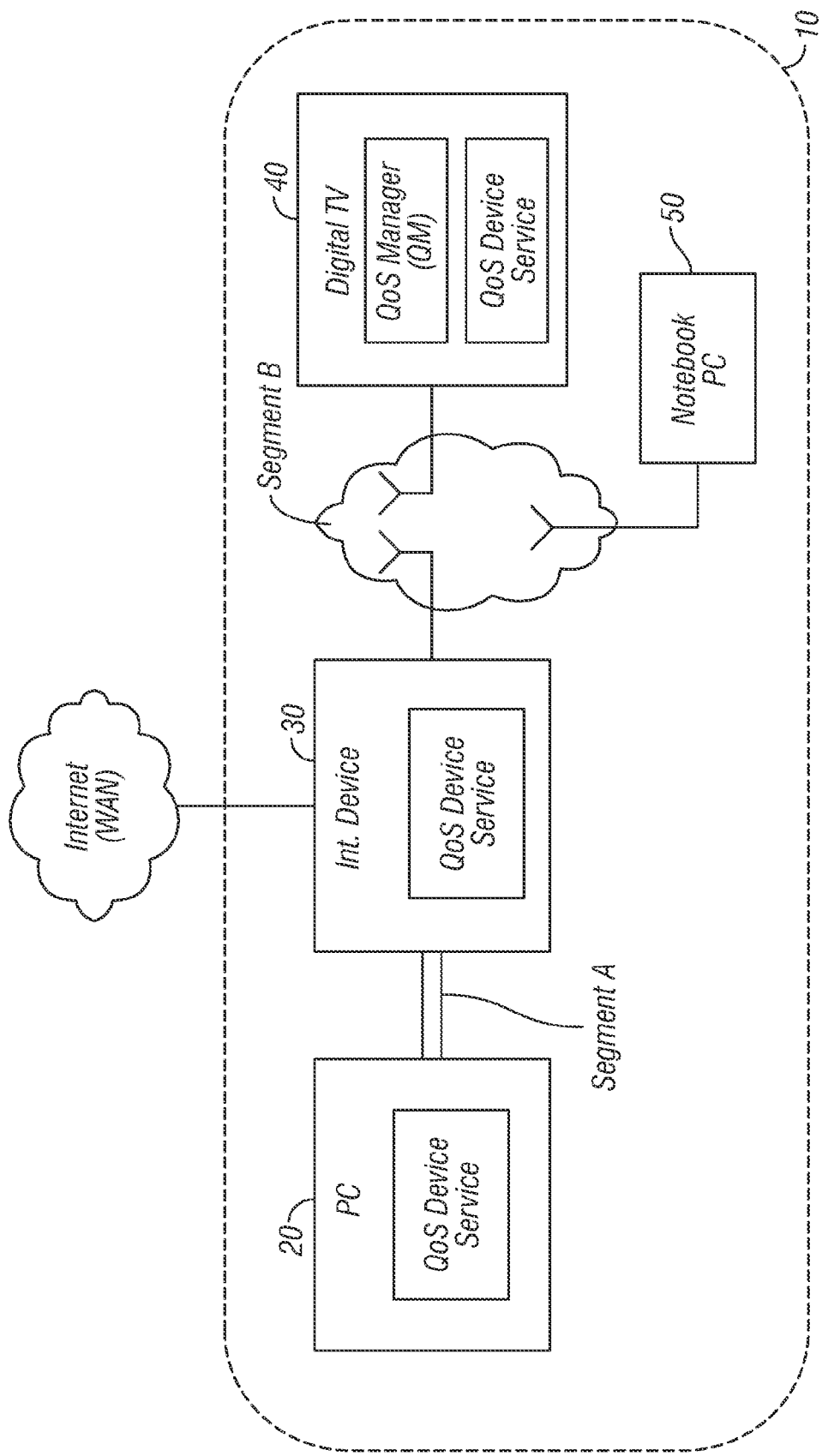
FIG. 1 is a block diagram of a home LAN with two LAN segments with network devices having QoS capability.

FIG. 1 shows the LAN 10 with an AV source device 20, an AV sink device 40, and an intermediate device 30. The LAN 10 is shown with two network segments, with network Segment A including source device 20 and intermediate device 30, and a different network Segment B including intermediate device 30 and sink device 40. Segments A and B are networks different from each other and may be, for example, Ethernet, IEEE 802.11e or 802.3, UWB or PLC networks. In one example, for ease of understanding, the source device 20 may be a PC (the media server) with a stored video previously captured from a digital video (DV) camera, and the sink device 40 may be a digital TV (the media renderer). The intermediate device 30 may be an access point (AP) that is connected to a wide area network (WAN) such as the Internet, for example by a cable modem. The AP is connected to the source device 20 by Ethernet (Segment A), and to the sink device 40 by wireless IEEE 802.11e (Segment B). A notebook PC 50 is part of network Segment B.

In this example, it is desired that the AV traffic stream from the PC (media server) to the digital TV (media renderer) be of high quality, which is determined by bandwidth and latency. Once the AV stream is established, the quality of the stream should not be degraded during normal operation, regardless of what else is happening on the network. As shown in FIG. 1, other devices on the network Segment B, such as a notebook PC 50 which is connected to the AP (intermediate device 30), may also be using the available network bandwidth, for example by downloading files from the Internet. Thus to assure the high quality of the AV traffic stream it is necessary that parameters defining QoS for the AV traffic stream be available to the intermediate device 30 so that it can configure QoS on its network Segment B to which notebook PC 50 is also connected.

As shown in FIG. 1, each of the source, intermediate and sink devices includes a QoS Device Service, which enables the device to implement QoS parameters. The sink device 40 also includes a QoS parameter holder (QPH), which in the case of UPnP is referred to as the QoS Manager (QM). The QPH conveys the appropriate QoS parameters to the source device 20. The QPH does not need to be located in the sink device, as shown by QM in sink device 40, but can be located in one or more other network devices. Any device can function as a QPH if it contains the QoS parameters and can respond to a query for the QoS parameters. For example, if the QoS Device Service in the source (or another intermediate) device contains the QoS parameters and can respond to a query for the QoS parameters, it can be a QPH. However, in the embodiments described herein, we refer to the QPH as the QM as defined in UPnP QoS. The QoS Device Service and QM are software modules or components of executable code located within memory of the device. Each of the source, intermediate and sink devices includes a processor, e.g., microprocessor, microcontroller or digital signal processor (DSP), that performs logical and arithmetic operations based on program instructions stored in memory of the device.

In UPnP the QoS parameters are contained in the UPnP Traffic Specification (TSPEC). TSPEC includes parameters such as Traffic ID, and traffic characteristics like peak rate, mean rate, delay requirement and loss requirement. TSPEC is represented in the form of an XML structure in the CDS. In the UPnP AV scenario, the TSPEC XML is extracted from the CDS and inserted into the Traffic Descriptor associated with the AV media content item.

In the conventional method proposed in the UPnP standards, after the traffic stream has been established, the QM initiates QoS configuration of all devices along the path of the traffic stream, including the intermediate device. The QM receives the TrafficDescriptor, which is the representation of a traffic stream structure and which includes the QoS parameters in TSPEC, and applies the appropriate QoS policy for the TrafficDescriptor. The QoS policy may come from an optional QoS Policy Service, which can be controlled by the network user, or from a default policy. The QoS policy includes the relative importance of a particular traffic stream, such as a TrafficImportanceNumber and a UserImportanceNumber. The QM conveys these parameters to the devices and then the QoS Device Service in each device configures the device for handling the new traffic. The TrafficImportanceNumber in turn is used in deriving the technology-specific access priority. The internal mechanism used by the QoS Device Service for applying the TrafficImportanceNumber is typically by tagging the packets to be transmitted. For example, in a HomePlug™ network four priority levels are defined by the standard, so the TrafficImportanceNumber would be converted to one of these priority levels.

The conventional UPnP QoS configuration method requires signaling to each network device along the path of the traffic stream, including the intermediate device. This requires the QM to discover the path of the traffic stream and then send the QoS parameters to each of the devices along the path. This method is considered relatively complex.

In this invention, the QoS setup for an intermediate device and the network segment to which it is attached occurs after QoS signaling configures QoS in just the two end devices, i.e., the source and the sink. While this end-to-end QoS method is relatively easier to implement than the above-described conventional UPnP method, it does not configure an intermediate device with the QoS parameters. One proposed solution to configuring the intermediate device in this end-to-end method is "auto-connect", wherein the intermediate device measures the AV data to determine the QoS parameters. However, in many cases, the accuracy and speed of the measurement may render the auto-connect approach unreliable.

In this invention, after QoS has been set up in the source and sink devices using the end-to-end method, the intermediate device determines that it needs to set up QoS for an AV stream, for example, by detecting the AV stream from the packet pattern or the IP/port/protocol information. The intermediate device queries the QPH with the AV stream information (IP addresses, port numbers, protocol, etc) of this AV connection to get the QoS parameters for this stream. After receiving the response from the QPH, the intermediate device or node, which is typically a router, bridge or hub connected to its own network segment, knows the QoS parameters for the AV media item and uses the QoS parameters to configure QoS in its network segment. In particular, the intermediate device uses the QoS parameters to determine how much bandwidth should be allocated for this AV media item.

Figure 2A:
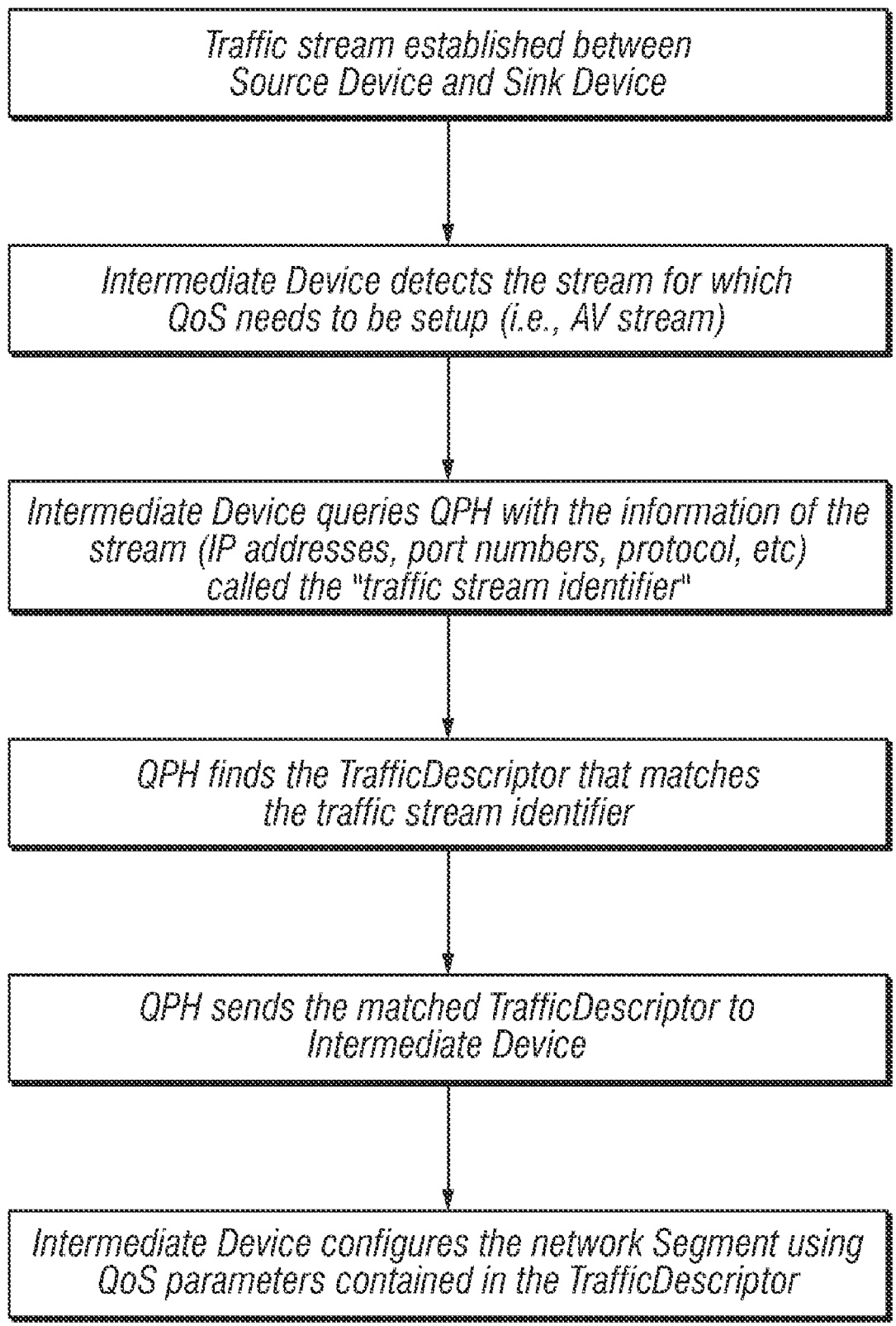
FIG. 2A is a flow chart illustrating a first embodiment of the method of this invention for configuration of the network segment with QoS.

FIG. 2A is a flow chart for one embodiment of this invention. In describing the method of this invention, syntax similar to that defined for UPnP QoS will be used. After the traffic stream has been established, the intermediate device detects the AV stream connection for which QoS needs to be set up. Then the intermediate device queries the QPH with stream information (IP addresses, port numbers, protocol, etc) of this AV connection. Such information about the stream can be called the traffic stream identifier (Traffic ID in UPnP QoS). The QPH then exposes a new action like QM:FindTrafficDescriptor (in the case of QM being the QPH). The input of this action to the QPH will be the traffic stream identifier. The QPH then finds the traffic for which the TrafficDescriptor matches the traffic stream identifier in the intermediate device. The TrafficDescriptor includes the TrafficID field that contains an extensible markup language (XML) structure consisting of: SourceIP; DestinationIP; SourcePort; DestinationPort; Protocol. The QPH then returns the TrafficDescriptor to the intermediate device with the TSPEC containing the appropriate QoS parameters. The QoS Device Service in the intermediate device then uses these QoS parameters to configure its network segment. This assures that other devices on the network segment (such as notebook PC 50 on Segment B in FIG. 1) can not affect the QoS of the AV traffic stream from the media server (source device 20) to the media renderer (sink device 40). After QoS has been configured on the intermediate device and its network segment, the intermediate device may optionally signal the QM with the status of the QoS configuration for the network segment, e.g., that QoS setup has been successful or has failed.

It is possible that the input to QPH includes only part of the traffic stream identifier (SourceIP; DestinationIP; SourcePort; DestinationPort; Protocol). In such a case, the output from QPH may have more than one matched TrafficDescriptors returned to the intermediate device. If so, the intermediate device need decide which one to apply for the QOS configuration based on more information gathered. In a case like this a second embodiment of this invention may be utilized, as described below.

Figure 2B:
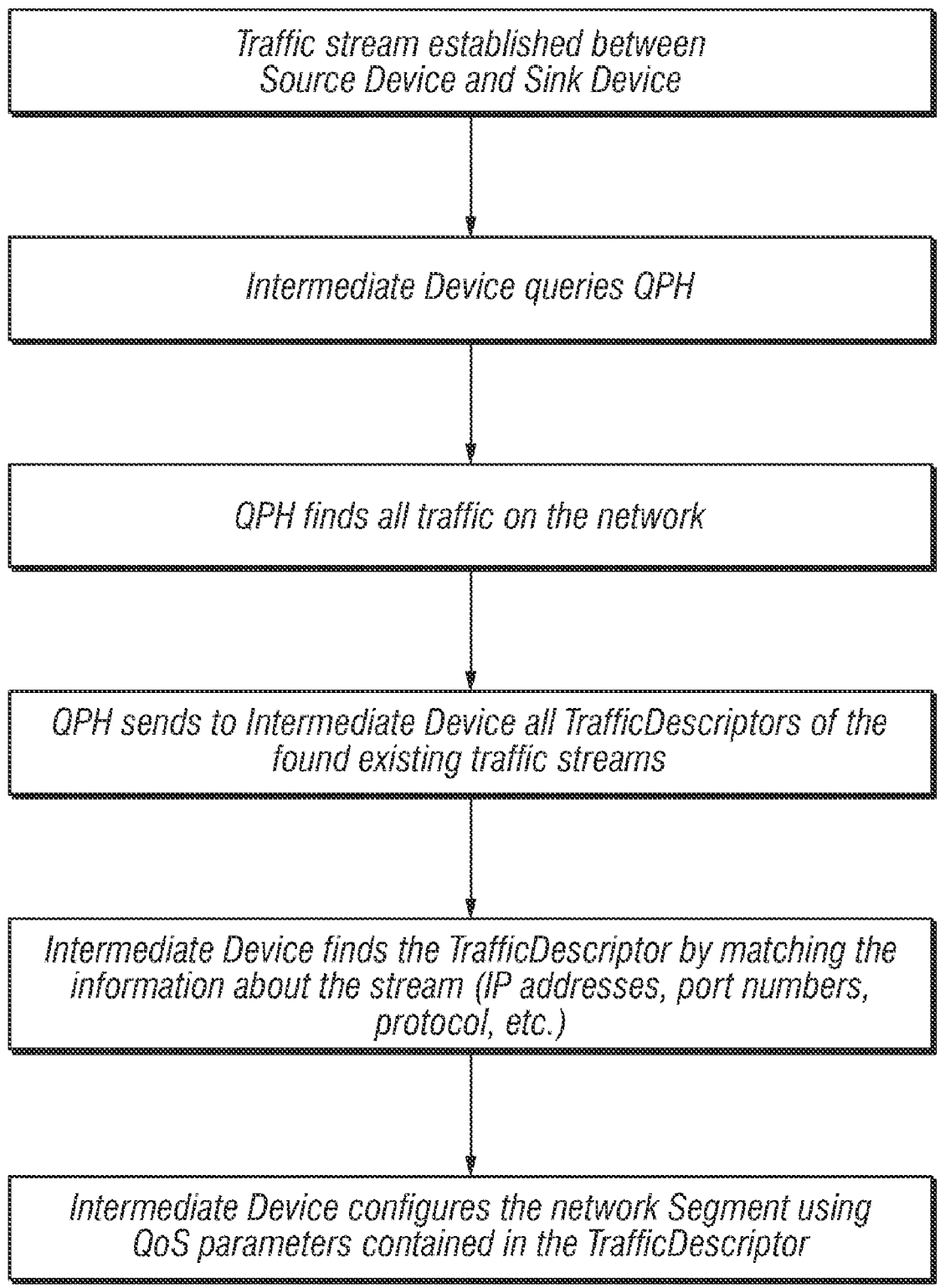
FIG. 2B is a flow chart illustrating a second embodiment of the method of this invention for configuration of the network segment with QoS.

FIG. 2B is a flow chart for a second embodiment of this invention. After the traffic stream has been established the intermediate device queries the QPH. This query invokes QM:BrowseAllTrafficDescriptors action in the QM (in the cases of QM being the QPH). The QM then sends back to the intermediate device the TrafficDescriptors with their corresponding TSPECs containing QoS parameters for all traffic streams on the network. The intermediate device will then have received multiples sets of QoS parameters, each set being contained in a corresponding TrafficDescriptor. The QoS Device Service in the intermediate device then matches the TrafficDescriptor by using the information it has about the stream. This TrafficDescriptor contains the QoS parameters which the intermediate device uses to configure its network segment with QoS.

In the above embodiments, it is assumed that the QPH (the QM in a UPnP-based network) is located in the sink device. However, in a more general case where the QPH is not necessarily located in sink device, or where multiple QPHs exist, a multicast query from the intermediate device to the stream owner may be required. Alternatively, in such a general case, the QoS query can be sent to either the source device or the sink device since both devices will have the QoS parameters and thus function as a QPH. As described previously, any device can be a QPH if it contains the QoS parameters and can respond to a query. In such a case, the action of a QoS device (QD), such as QD:GetQoSState, can be used to return the QoS parameters along with other information in the TrafficDescriptors that are currently active. Then the QoS Device Service in the intermediate device will match the traffic information it knows to find the corresponding TrafficDescriptor. This TrafficDescriptor contains the QoS parameters the intermediate device uses to configure its network segment with QoS.

Figure 3:
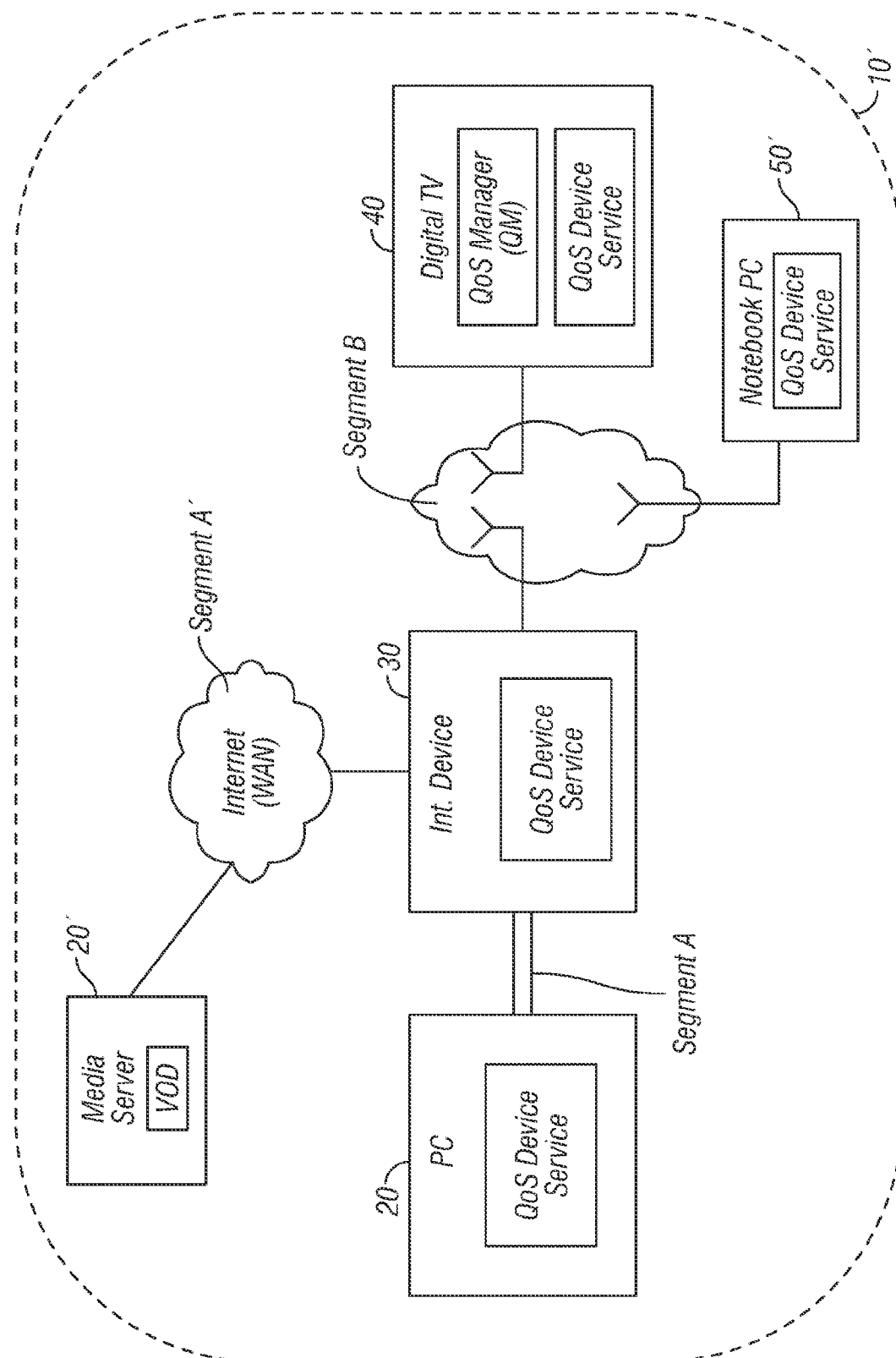
FIG. 3 is a block diagram of a network with a LAN segment and a WAN segment with network devices having QoS capability.

While the invention has been described with respect to a LAN with two segments having an intermediate device between the two segments, the invention is also applicable to a network wherein one of the segments is a wide area network (WAN), such as the Internet. This is illustrated in the example network 10' of FIG. 3, which is essentially the same as the network example of FIG. 1, but wherein a network Segment A' includes the intermediate device 30 and an entertainment provider's server 20' that supplies a video-on-demand (VOD) for downloading over the Internet. In this example the source device is the entertainment provider's server 20' (the media server) and the sink device is the notebook PC 50' (the media renderer) that includes a QoS Device Service, and optionally a QM. The network Segment A' is the WAN that includes the source server 20' and the AP intermediate device 30, and a different network segment (Segment B) is the wireless LAN that includes the AP intermediate device 30 and the notebook PC 50'.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for quality-of-service (QoS) setup in a network segment of a network having multiple network segments that do not share a common physical medium, the network including a plurality of network devices including a source device for transmitting a data traffic stream, a sink device connected to said network segment for receiving the traffic stream from the source device, and an intermediate device connected to said network segment and through which the traffic stream passes from the source device to the sink device, and wherein one of said plurality of network devices other than the intermediate device contains a QoS parameter holder (QPH), the method comprising:

signaling the source device and the sink device from the QPH with QoS parameters to thereby configure the source device and sink device with the QoS parameters;

transmitting a traffic stream from the source device through the intermediate device to the sink device;

detecting at the intermediate device a traffic stream identifier from the traffic stream;

querying the QPH for QoS parameters associated with the detected traffic stream identifier;

sending QoS parameters from the QPH;

receiving at the intermediate device QoS parameters from the QPH; and configuring said network segment with the QoS parameters received at the intermediate device.

2. The method of claim 1 wherein querying the QPH comprises sending the traffic stream identifier from the intermediate device to the QPH, further comprising associating at the QPH the traffic stream identifier with QoS parameters, and wherein sending the QoS parameters from the QPH comprises sending the QoS parameters associated with the detected traffic stream identifier.

3. The method of claim 1 wherein there are multiple traffic streams on the network and wherein querying the QPH comprises providing the QPH with only part of the traffic stream identifier and wherein sending QoS parameters from the QPH comprises sending multiple sets of QoS parameters to the intermediate device, each QoS parameter set being associated with a traffic stream, and further comprising selecting, at the intermediate device, the QoS parameter set associated with the traffic stream identified by the intermediate device from among the multiple sets of QoS parameters.

4. The method of claim 1 wherein the network is a local area network (LAN), wherein a first LAN segment comprises the source device and the intermediate device and wherein said network segment to receive said QoS setup is a second LAN segment comprising the intermediate device and the sink device.

5. The method of claim 1 wherein the data traffic stream is an audio/visual (AV) traffic stream.

6. The method of claim 1 wherein each of the source, intermediate and sink devices is a universal-plug-and-play (UPnP) device containing QoS Device Service.

7. The method of claim 6 wherein the QPH is a UPnP QoS Manager (QM).

8. The method of claim 7 wherein the QoS parameters are contained within a TrafficSpecification (TSPEC).

9. The method of claim 1 wherein the QPH is located within the sink device.

10. The method of claim 1 further comprising, after configuring said network segment with the QoS parameters, signaling the QPH from the intermediate device with the status of the QoS configuration.

11. A method for configuring quality-of-service (QoS) in a local area network (LAN) having two network segments that do not share a common physical medium and a plurality of devices including an audio-video (AV) media server on the first network segment for transmitting an AV traffic stream, an AV media renderer on the second network segment for receiving the AV traffic stream, and an intermediate device between the media server and media renderer through which the AV traffic stream passes, the intermediate device being connected to the first and second network segments, the method comprising:

providing in one of the devices, other than said intermediate device, a QoS parameter holder (QPH);

signaling the media server and media renderer from the QPH with the QoS parameters to thereby configure the media server and media renderer with the QoS parameters;

transmitting an AV traffic stream from the media server through the intermediate device to the media renderer;

detecting at the intermediate device a traffic stream identifier from the AV traffic stream;

querying the QPH from the intermediate device with the detected traffic stream identifier;

sending from the QPH to the intermediate device the QoS parameters associated with the traffic stream identifier;

receiving at the intermediate device the QoS parameters from the QPH; and configuring the second network segment with the QoS parameters received at the intermediate device.

12. The method of claim 11 wherein the first network segment is a wireless local area network (WLAN) and the second network segment is a powerline communications (PLC) network.

13. The method of claim 11 wherein the first network segment is a powerline communications (PLC) network and the second network segment is a wireless local area network (WLAN).

14. The method of claim 11 wherein each of the media server, intermediate device, and media renderer is a universal-plug-and-play (UPnP) device containing QoS Device Service.

15. The method of claim 14 wherein the QPH is a UPnP QoS Manager (QM).

16. The method of claim 15 wherein the QoS parameters are contained within a TrafficSpecification (TSPEC).

17. The method of claim 11 wherein the QPH is located within the media renderer.

18. The method of claim 11 further comprising, after configuring the second network segment with the QoS parameters, signaling the QPH from the intermediate device with the status of the QoS configuration.

19. A network having two network segments that do not share a common physical medium and a plurality of network devices including an audio-video (AV) media server on the first network segment for transmitting an AV traffic stream, an AV media renderer on the second network segment for receiving the AV traffic stream, and an intermediate device connected between the network segments and through which the AV traffic stream passes from the media server to the media renderer, each of the media server and media renderer having memory containing quality-of-service (QoS) parameters for the AV traffic stream, the intermediate device having a processor and memory containing computer program instructions for performing the processor-implemented method steps of:

after each of the media server and media renderer is configured with the QoS parameters and the AV traffic stream is established between the media server and the media renderer, detecting a traffic stream identifier from the AV traffic stream;

querying a device selected from the media server and the media renderer with the detected traffic stream identifier to obtain the QoS parameters;

receiving the QoS parameters from the queried device; and configuring the second network segment with the received QoS parameters.

20. The network of claim 19 wherein the queried device includes a QoS parameter holder (QPH) in its memory and wherein the computer program instructions in the intermediate device's memory include an instruction for signaling the QPH in the queried device with the status of the QoS configuration.

21. The network of claim 19 wherein the first network segment is a wireless local area network (WLAN) and the second network segment is a powerline communications (PLC) network.

22. The network of claim 19 wherein the first network segment is a powerline communications (PLC) network and the second network segment is a wireless local area network (WLAN).

23. The network of claim 19 wherein the media server and media renderer each includes a processor and memory, and wherein each of the media server, intermediate device, and media renderer is a universal-plug-and-play (UPnP) device containing computer program instructions stored in its memory for executing UPnP QoS Device Service instructions, and wherein the QoS parameters are contained within a UPnP TrafficSpecification (TSPEC).

* * * * *